United States Patent [19]

Clow

[11] 4,084,880
[45] Apr. 18, 1978

[54] COHERENT OPTICAL COMPUTER FOR POLYNOMIAL EVALUATION

[76] Inventor: Richard G. Clow, 624 Black Canyon Stage, Phoenix, Ariz. 85020

[21] Appl. No.: 679,552

[22] Filed: Apr. 23, 1976

Related U.S. Application Data

[63] Continuation-in-part of Ser. No. 543,173, Jan. 22, 1975, abandoned, which is a continuation of Ser. No. 398,332, Sep. 18, 1973, abandoned, which is a continuation of Ser. No. 117,784, Feb. 22, 1971, abandoned, which is a continuation of Ser. No. 720,262, Apr. 10, 1968, abandoned.

[51] Int. Cl.$^2$ .................. G03H 1/26; G02F 3/00; G06G 9/00
[52] U.S. Cl. .................. 350/3.72; 350/162 R; 364/200; 364/713; 364/837
[58] Field of Search .................. 340/172.5; 235/181; 350/3.5, 162 R, 162 SF; 250/550; 356/71

[56] References Cited

U.S. PATENT DOCUMENTS

| 3,553,460 | 1/1971 | Preston | 350/3.5 |
| 3,652,162 | 3/1972 | Noble | 350/162 SF |
| 3,771,129 | 11/1973 | McMahon | 356/71 |

*Primary Examiner*—Ronald J. Stern

[57] ABSTRACT

A holographic polynomial computer in which powers and products of the input variables are obtained by repeated diffraction at the input hologram. The information bearing beams are split, redirected, and combined by thick holograms acting as mirrors. Many real, complex or Boolean polynomials in many variables are evaluated simultaneously in parallel. Input variables and coefficients are represented by diffraction efficiencies of holograms. Final and intermediate results are represented by amplitudes of coherent optical beams. Multiplication is performed by diffracting a beam from a hologram and addition is performed by combining beams. The computer may be controlled to compute alternate functions of the input data by supplying alternate optical input beams.

9 Claims, 4 Drawing Figures

COHERENT OPTICAL COMPUTER FOR POLYNOMIAL EVALUATION

CROSS REFERENCES TO RELATED APPLICATIONS

This application is a continuation-in-part of application Ser. No. 543,173 filed Jan. 22, 1975 which is a continuation of application Ser. No. 398,332 filed Sept. 18, 1973 which is itself a continuation of application Ser. No. 117,784 filed Feb. 22, 1971 which is in turn a continuation of application Ser. No. 720,262 filed Apr. 10, 1968 all of which are now abandoned.

BACKGROUND OF THE INVENTION.

This invention is in the field of electrical communications and relates to data processing systems having an internal program element and which represent numerical information by electromagnetic radiation of optical wavelengths, and more particularly to such systems as may be applied to pattern recognition.

In early optical computers, input numerical quantities were represented by the optical transmission at one particular point on a photographic transparency and the results were represented by the optical intensities of light rays. When a ray passed through a point on the transparency, an attenuation occurred that provided a multiplication of the quantity represented by the ray and when several rays converged to a point the intensities combined linearly to provide an additive capability. An account of these "incoherent" optical computers has been given by B. J. Howell, Jour. Optical Soc. Am., Vol. 49, No. 10, p. 1012, October 1959. A typical device of this type is Berger's cross-correlator, U.S. Pat. No. 2,787,188. In Berger's invention, the input variables are the values of the functions to be correlated and the output result is the cross-correlation function; each value of this function being a (different) function of the input variables. These many output numerical values are computed simultaneously (in parallel) from the input data by rays passing through the input transparencies. This parallelism gives these simple inexpensive computing devices a very high data processing rate.

Berger's correlator directed a ray only once through the input transparency and hence was limited to output results linear in the input variables. By making both transparencies represent the same function, it computes the auto-correlation function which is non-linear in the input since it contains products and powers of the values of the input function, i.e., products and powers of the input variables. To eliminate the inconvenience of providing two copies of the same input function, L. Kovasynay and A. Arman, Rev. Sci. Instr., Vol. 28, p. 793, October 1957, showed how suitably located mirrors could be used to redirect the rays so that they passed twice through a single input transparency to produce the auto-correlation function. By redirecting the rays through optical fibers to repeated passage through the input transparency, Gamba, U.S. Pat. No. 3,323,407, constructed a computing device which evaluates more general non-linear polynomial functions of the input. A disadvantage of that technique is that the coefficients of the polynomials could not be controlled, but were necessarily random; however, Gamba showed the even then polynomial functions could be very useful as discriminant functions in pattern recognition. (When an image or pattern is represented by, possibly many, numerical quantities certain functions of these variables, called discriminant functions, indicate the presence of certain key features in the pattern when the values of the functions exceed certain thresholds.)

The incoherent optical computers that use intensities to represent numerical quantities are limited to positive values since intensities cannot be negative. In the 1950's, it was recognized that numbers could be represented by the complex amplitudes of the rays, and by the complex transmissions of transparencies. This allowed negative numbers to be handled. When coherent light is used, amplitudes combine linearly to provide the additive capability. By taking advantage of the Fourier transforming property of a lens, a spatial filtering can be performed in this way which is equivalent to a cross-correlation with negative or complex coefficients, e.g., see C. O. Carlson, U.S. Pat. No. 3,085,469.

In early coherent optical computers, a difficulty was found in adjusting the argument of the complex transmission of the transparencies since variations in the index of refraction of the supporting substrate, film or glass plate, also influenced the phase of the transmitted wave. This difficulty was overcome by the introduction of holographic methods. In holography, a data value (or image point) is recorded as a widely dispersed holographic element (e.g., a photographic "diffraction grating") on either a photographic film or throughout the volume of a photosensitive block, rather than as a concentration (or point) of photosensitive material. The data storage capability of the recording medium is not reduced by storing data by spatially dispersed elements because the elements are allowed to overlap. Indeed, the storage capacity is in fact increased because a single film defect does not obliterate any data value but merely reduces the accuracy of retrieval of all stored data values with elements containing the defect. Each such element can modulate a suitable diffracted optical beam. It was found that the "diffraction efficiency" of these elements was easily controllable to form visible images or could act multiplicatively on the diffracted beam in both phase and amplitude. The phase of the diffracted beam is detetmined by the spatial displacement of the bars of the dispersed grating and thus little affected by any one optical imperfection of the medium. An excellent account of holography has been given by R. J. Collier, IEEE Spectrum, Vol. 3, p. 67, July 1966.

In an article in IEEE Spectrum, Vol. 1, p. 101, Oct. 1964, L. J. Cutrona shows how the transparencies and masks of earlier coherent optical computers can be replaced with holograms to allow linear computations with negative and complex numbers. The transmission of the earlier transparency is replaced by the diffraction of a hologram such that a value of a numerical quantity is represented by a diffraction efficiency of a hologram. In particular, Cutrona cites B. A. Vander Lugt, IEEE Trans. Information Theory, Vol. IT-10, No. 2, p. 139, Apr. 1964, who shows how complex spatial filters (a special type of linear operation) can be used in pattern recognition by means of an electronic threshold device. Recognition is indicated by a sufficiently bright spot (high discriminant function value) in the pictorial output of the holographic device. Cutrona (op. cit.) also suggests that a non-linear capability could be attained in coherent optical computers by replication of input transparencies and their insertion at two or more parts of the device to produce an auto-correlation function.

In the simplest holographic concept, the recording medium is very thin film. Thin holograms look like photographic transparencies except that in incoherent white light they appear a uniform gray since the image points or data points are dispersed over the entire film. A suitable coherent light beam is needed to bring out the encoded image or access the data values. An entirely different effect is produced when a substantially thicker photosensitive medium is used. Then the diffraction efficiency can be so large that most of the incident light is diffracted back in the general direction of the source as by a mirror. Collier (op. cit.) explains how thick holograms can act as mirrors. Such holograms can be quite selective in their diffracting capability allowing some beams to pass while strongly diffracting others. Even ordinary commercial fine grain photographic film has a thick enough emulsion to exhibit the effects of thick holograms as explained by E. N. Leith, et al., Applied Optics. Vol. 5, No. 8, p. 1303, August 1966.

Even thicker holograms have been prepared in solid crystalline media and their applications to data storage have been described by P. J. van Heerden, Applied Optics, Vol. 2, No. 4, p. 393, April 1963. Van Heerden shows how a three-dimensional diffraction grating consisting of equally spaced planes of optically altered material may extend throughout the volume of the crystal and diffract an incident plane wave if and only if the plane wave makes a certain angle (the so-called Bragg angle) to the diffraction grating planes. Even though the crystal may contain very many such overlapping diffraction elements, they can be selectively accessed or read out by adjusting the angle of the incident wave. Van Heerden shows how an extremely large data storage capacity may be obtained in this way. Even though van Heerden does not use the term hologram, it is clear from other references such as Collier (op. cit.) or Leith, et al. (op. cit.), that van Heerden's device would be considered holographic in current terminology.

Both coherent and incoherent optical computers described above may be said to be passive, in that once the input optical illumination is supplied, no additional energy is required to form the products and sums used in the output. The many output values are formed simultaneously and essentially instantaneously by the passage of the optical rays and beams through the computer.

This discussion of prior art optical computers has described incoherent optical computers which form non-linear polynomial functions of input data recorded on a single transparency. Also, coherent optical computers have been described which form linear functions of the input data and make use of the high data storage capacity of holograms and their capability of storing negative and complex numbers. When applied to the calculation of linear discriminant functions, this type of computing device has proven effective in pattern recognition. It should be noted that improvements in pattern recognition capability can be expected if non-linear polynomial discriminant functions are used as shown by D. F. Specht, IEEE Trans. Electronic Computers, Vol. EC-16, No. 3, p. 308, June 1967. Also, polynomials are well known to be useful for approximating non-algebraic functions (e.g., truncated Taylor series), but negative coefficients are needed in these approximations.

SUMMARY OF THE INVENTION

The prior art optical computing devices and techniques previously described are combined to form a coherent optical computer which simultaneously computes many non-linear polynomial functions of many input variables from a single copy of the input data and also achieves the high data storage density of holographic computers and their practical capability of handling negative and complex numbers. As in prior art coherent optical computers, input data and coefficients are represented as the diffraction efficiencies of an input means and a coefficient means respectively; final and intermediate results are represented as the amplitudes of coherent optical beams, multiplication is performed by diffracting optical beams with diffractive elements and addition is performed by combining the amplitudes of optical beams. In the disclosed invention, the higher powers and products of the input variables are obtained by redirecting beams diffracted by the input means so as to be diffracted again by the same or different diffractive elements. This redirection is accomplished by diffractive mirrors and may be realized by thick holograms acting as synthetic mirrors. Also in the disclosed invention, the output may be formed by combining beams representing the individual terms of the polynomial so that sums are represented over a region of space and not just at one point. Beam combining is accomplished by hologram elements acting as semi-mirrors to combine the two beams which formed the element. Multiplication by coefficients and combining of beams are accomplished simultaneously by using the diffraction efficiencies of the combining holograms to represent coefficient values. The disclosed invention may also include a diffractive device to split the optical input beam into many beams and direct them to the input. This device may also represent the coefficients as diffraction efficiencies, but typically would be used to select terms to be included in the polynomials and thus serve as a program means for the computer. All diffractive devices are typically realized by holograms, and diffractive elements may be hologram elements.

In the operation of this computer, an optical input beam and the beams split from it by the program means are incident on the input means. Each such beam incident on the input forms a diffracted beam emanating from the input with amplitude depending on an input variable. These beams may then be redirected by diffractive mirrors to return to the input means for subsequent diffraction to form diffracted beams with amplitudes dependent on non-linear functions of the input variables such as powers and products of two or more variables. These beams are diffractively combined in the coefficient means to form output beams. This diffraction will typically impose a selective attenuation on the beams as they are combined so as to realize multiplication by the coefficients of the polynomial, i.e., to form the terms of the polynomial. Combining the beams then realizes the addition of these terms to form the values of the polynomial functions represented by the amplitudes of the output beams. These outputs are formed passively and essentially instantaneously by the passage of optical beams through the computer.

For a fixed optical input beam, each output beam represents some particular function of the input variables. As a special case, this may be a linear function or a linear functional of the input data. The function realized by any particular output beam may be changed by providing alternate optical input beams or several optical input beams.

The polynomials formed by the computer may be considered to be Boolean polynomials, or logic functions, if the methods of representing numerical quantities are suitably interpreted. If the complement of each binary input variable is presented along with the value of the variable, all Boolean functions may be evaluated.

The disclosed invention may be distinguished from Gamba's invention (op. cit.) and other incoherent optical computers in that diffractive processes are used to store information and coherent light is used as a computational medium. The coherent-diffractive implementation permits the use of (a) holographic techniques by which information storage density is greatly improved; (b) thick holograms as mirrors to direct light so that very many mirrors may be practically emplaced to form specific (non-random) polynomial functions; (c) representations of negative and complex numbers. The disclosed invention differs from coherent optical data processing devices such as Vander Lugts (op. cit.) and van Heerden's (op. cit.) in that is forms outputs representing non-linear polynomial functions of the input data. The disclosed invention differs from the coherent optical auto-correlators described by Cutrona (op. cit.) in that it forms non-linear products of input variables with the use of only one copy of the input, thus facilitating real time presentation of data to the computer. The disclosed invention differs from all the prior art optical computers mentioned above in that it uses diffractive or holographic semi-mirrors to combine optical beams to represent sums over extensive regions of space rather than forming sums by combining amplitudes at one point. e.g., at the intersections of rays.

DETAILED DESCRIPTION OF THE INVENTION

The standard mathematical form of a polynomial function of many variables $x$, $y$, etc. is:

$$f(x,y,\ldots) = ax + by + \ldots + cx^2 + dy^2 + \ldots + exy + \ldots + hx^n$$

where $a, b, c, d, e, h$, etc. are constants which are the coefficients of the polynomial and $n$ is the degree of the polynomial. If the degree is one, i.e., if all coefficients of all powers $x^2, y^2, x^3$, etc., and all products $xy, xy^2$, etc. are zero, then the polynomial is a linear function of $x, y$, etc., such as $ax + by$. Typically, the invention would evaluate $f(x,y,\ldots)$ and simultaneously many other polynomial functions such as $g(x,y,\ldots)$ where the coefficients of $g(x,y,\ldots)$ would be different from those of $f(x,y,\ldots)$.

The values of the variables $x,y$, etc., may be taken as the values of another function $s(t)$, e.g., $x = s(t_1)$, $y = s(t_2)$, etc. The coefficients could be the values of still another function $k(t)$, e.g., $a = k(t_1)$, $b = k(t_2)$, etc. The various outputs could be approximate values of the cross-correlation function $m(u)$ of $s$ and $k$, e.g., $$f = m(u_1), g = m(u_2) = ax + by + \ldots = k(t_1)s(t_1) + k(t_2)s(t_2) + \ldots$$

Many other mathematical calculations may also be reduced to the evaluation of polynomials.

The functions evaluated by the disclosed optical computer are all of the above polynomial form. They require only the execution of the basic mathematical operations of addition and multiplication. The following description of the computer will therefore be concerned largely with the techniques used to perform addition and multiplication and how these operations are related.

The mathematical organization of this computer is quite straightforward: the products of the variables are formed first; these are then multiplied by the coefficients and then the terms are added; exactly as indicated by the standard polynomial form. However, it may be worthwhile to describe this process in detail since the handling of intermediate results may be slightly different from other computing processes.

Figure 1:
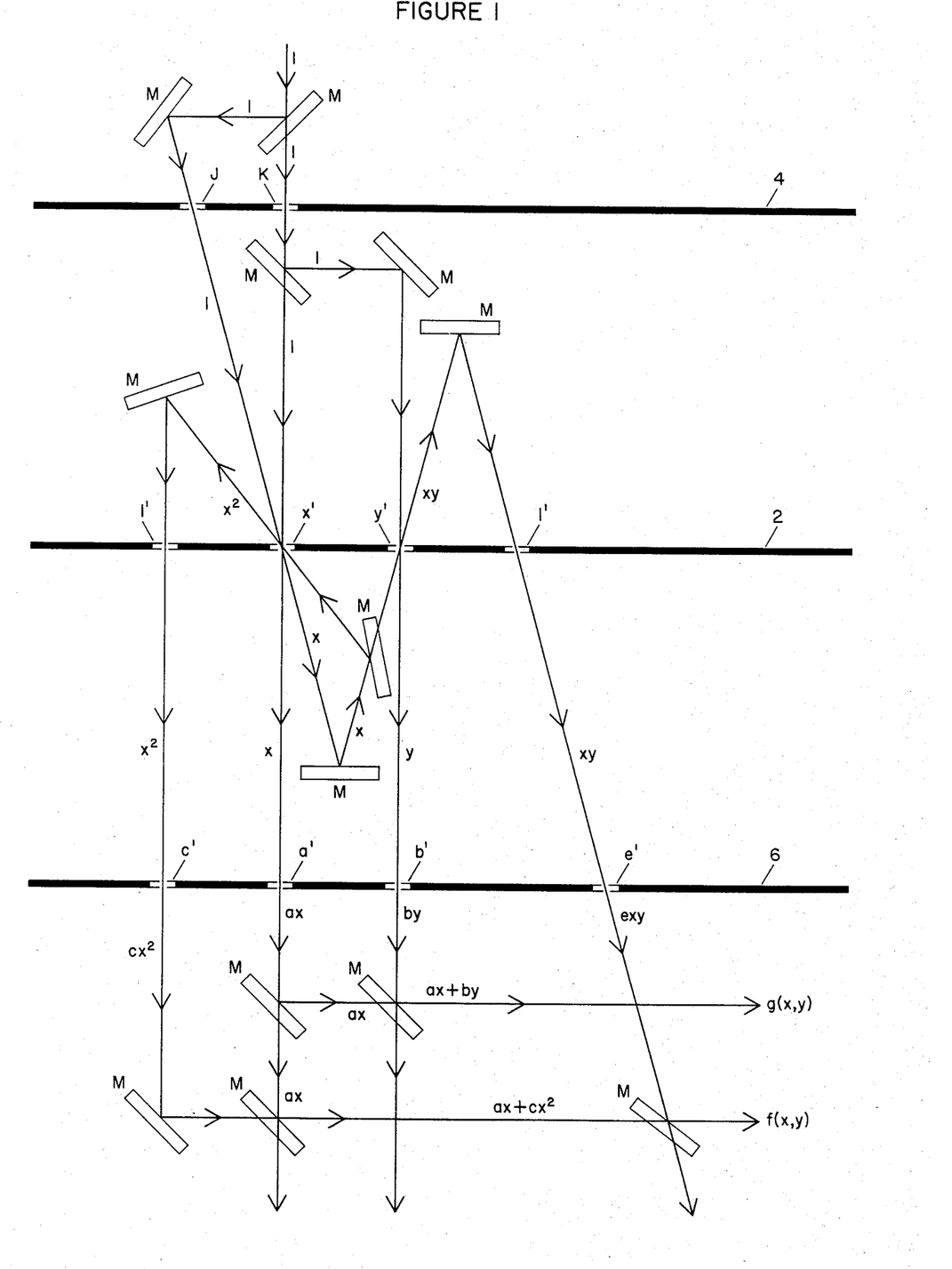
FIG. 1 is a schematic diagram of the mathematical organization of computations as performed by the computer.

The organization of a possible computational scheme is illustrated in FIG. 1 which shows the evaluation of two functions $f$ and $g$ of the two variables $x$ and $y$:

$$f(x,y) = ax + cx^2 + exy$$

$$g(x,y) = ax + by$$

The second function is linear and the first is non-linear. This example is greatly simplified since typically the computer would evaluate many more functions of many more variables.

In FIG. 1, the information flow begins at the top with a representation of the unit value denoted 1. The device M creates a second representation of unity which will be used later. The original representation proceeds vertically downward, as indicated by the arrows, through another device M which creates a third representation of unity, until it reaches the representation of the input variable $x$, denoted $x'$, stored in the input store 2. There it is multiplied by $x$ to give $1 \cdot x = x$ as another representation of $x$. In the remainder of this paragraph, "a representation of $z$" will be denoted by "the quantity $z$," or by "a copy of $z$" or simply by "$z$". The quantity $x$ proceeds vertically downward to a representation of the coefficient a, denoted $a'$, stored in the coefficient store 6. There it is multiplied by a to give $a \cdot x = ax$ which proceeds vertically downward where it is duplicated by another device M to give two copies, one of which proceeds vertically downward while the other proceeds to the right. From the third copy of 1 produced above, a copy of $by$ is similarly produced. When the quantities $ax$ and $by$ are simultaneously incident on device M, the sum $ax + by$ is formed which is equal to the function $g(x,y)$. The second copy of 1 produced at the top of the figure is manipulated to access the variable $x$ in the input store 2 by a different path to produce a second copy of $x$. This is then redirected by devices M to access $x'$ (the copy of $x$ stored in the input store 2) a second time and produce a second multiplication by $x$ to give $x \cdot x = x^2$. The quantity $x^2$ passes through the input store 2 in a portion representing the value 1, denoted $1'$, so that the product $1 \cdot x^2 = x^2$ is formed. The proceeds vertically downward to the coefficient store 6 where it is multiplied by c to give $cx^2$. Similarly, the quantity $exy$ is produced and combined with the $cx^2$ and $ax$ to give $f(x,y)$. Note that it is possible to use a given term such as $ax$ in forming two distinct functions if each has this term.

The representations of 1 which initiated the computations described above passed downward through a program store 4 where they were unchanged in the example of FIG. 1. In a more general case, they could be multiplied there by coefficients J and K represented in the program store. In FIG. 1, J and K were equal to one. Note that if J were equal to zero, the output representation of $f(x,y)$ would be converted to $ax$ since the non-linear terms would be deleted. Thus the program store can influence and partially control the functions which the computer evaluates. The capability of calculation of alternate polynomial functions substantially extends the utility of the computer since it allows piecewise polynomial functions to be used in approximating other functions. A piecewise polynomial function is a function which is equal to some polynomial of its arguments but the particular polynomial used may depend on the values of the variables. If the polynomials are linear, this is called a piecewise linear function. Piecewise polynomial functions give much better approximations to other functions for a given maximum polynomial degree of the approximating polynomials. For example, the approximation of a curve by straight line segments could be much better than the approximation by any single straight line. In pattern recognition, it is often desirable to use different sets of polynomial discriminant functions at different times. For example, one set of discriminant functions may be appropriate for recognition of properly registered upright characters and another set of discriminant functions may be appropriate if the characters are uniformly inclined, as on a rotated page.

The schematic diagram of FIG. 1 could apply to some prior art optical computers as well as to the disclosed invention. In the incoherent optical computers, the output and intermediate results are represented by the intensities of optical rays which correspond to the flow lines of FIG. 1 marked with arrows. The input store 2 and the coefficient store 6 are photographic transparencies. The transmission of these transparencies at the points marked by the notation $x'$, $y'$, etc., and notation $a'$, $b'$, etc. are proportional to the values $x$, $y$, etc., and a, b, etc. The devices M are typically prisms, mirrors or semi-mirrors. When a copy of a quantity is made by a semi-mirror, two rays are produced, a transmitted ray and a reflected ray, with intensities proportional to the given quantity. Note that the constant of proportionality need not be the same, i.e., there may be a different scale factor for the two rays representing, say, ax. Also, the scale factor is necessarily different at each point of the ray since the ray is attenuated by its passage through the medium. The scale factor for representing the variables and coefficients by transmissions is also different for rays making different angles to the transparencies since the transmission wil be less for more oblique rays.

In the Berger cross-correlator, no mirrors or programming store are used. The lenses may be considered as made up of prisms which bend rays. The rays representing the input quantity 1 are emitted by an incoherently luminous surface and the sum is correctly represented in only one plane where the proper selection of rays cross. In the Kovasynay-Arman correlator, all mirrors M are positioned so that they are parts of just two mirror surfaces. In Gamba's invention, the devices M may be optical fibers which serve to redirect rays.

The schematic of FIG. 1 also represents some prior art coherent computer operations. For example, in a coherent spatial filter, the input store 2 could be a photographic transparency and the input variables $x, y, \ldots$ could be its Fourier components which are equivalent to sinusoidal diffraction gratings or hologram elements. The M devices between the input store 2 and the coefficient store 6 are prisms which form a lens which produces the Fourier transform on the coefficient store 6. The coefficient store 6 is a mask transmitting certain Fourier components and not others thus performing the filtering operation. The M devices at the bottom of the figure are prisms which form another lens which reproduces the filter image, each point of which is a linear function of the input data. Prior art coherent optical computers do not use mirrors as M devices and only linear functions of the input are computed from a single copy of the input values.

In the disclosed coherent optical computer, the final and intermediate results are represented by the amplitudes of coherent optical beams. Input variables and coefficients are represented by the diffraction efficiencies of diffractive devices, typically holograms. The devices M for directing the information bearing optical beams are realized diffractively, typically by thick holograms. Since holograms play an important role, their basic properties and interactions with coherent optical beams will be reviewed in the following paragraphs to carefully establish the terminology used in this disclosure.

In making a hologram, two coherent optical beams denoted beam A and beam B are caused to intersect in a photosensitive material. The incident optical energy causes changes in the optical properties of the material, by chemical development, if necessary, with the greater change where the intensity of the interference pattern is greater. When one beam, say B, is removed, the remaining beam A is diffracted by the hologram so as to reproduce that part of the beam B which passed through the hologram. In holographic imagery, one beam, say B, is that reflected by the object to be imaged, while the other, A, is selected to be an easily reproducible beam, e.g., a plane wave. Thus when the image beam B is removed, the plane wave A is converted into the image. Exact mathematical descriptions of this process have been given; however, it is possible for those familiar with elementary optics to see intuitively how a hologram works. This is done by reference to the theory of hologram elements.

The concept of a hologram element was presented by G. Rogers, Nature, Vol. 166, p. 273, 1950, who noted that when one beam, say, B, was a diverging spherical wave and the other, A, was a plane wave, and when the photosensitive material was a thin photographic film parallel to A, then the resulting interference pattern and hologram were geometrically similar to a Fresnel zone plate which when considered as a diffractive lens has just the right focal length to convert the plane wave to the diverging wave and vice versa. Rogers then reasoned that any optical wave field B can be analyzed into a sum of diverging spherical waves, one for each point source and hence any thin hologram made with a parallel plane reference wave could be analyzed into a sum of Fresnel zone plate elements, each acting independently to reproduce one equivalent point source in the incident field. These hologram elements have been described and illustrated by G. Stroke, International Science and Technology, p. 52, May 1965.

Another type of hologram element is formed when two plane waves are used. Plane waves can also produce useful elements because an arbitrary optical beam can be expressed as a sum of plane waves. This becomes evident when it is recalled that any beam can be focused in an image plane of point sources by a lens while another lens can recreate the beam by projecting the resulting image. When two coherent plane waves intersect, the resulting interference pattern is a series of equally spaced planes. When the photosensitive material is a planar thin film intersecting the interference pattern, the resulting hologram element is a sinusoidal diffraction grating and the reconstruction of one of the original plane waves from the other is directly evident from the theory of diffraction gratings. When the photosensitive material occupies a true volume, the resulting hologram may be called a three-dimensional diffraction grating. The second plane wave is reproduced by a process exactly analogous to the Bragg diffraction process of X-ray crystal analysis. From X-ray diffraction theory, it is clear that in the case of a true thick hologram element of this type, a diffracted beam is produced by any plane wave that makes the proper angle to the planes of the grating, but not by any plane wave making a different angle. The diffracted plane wave has the same angle to the planes of the grating as the incident wave just as if the wave was reflected from the planes. The hologram evidently acts as a mirror, i.e., the hologram element is a synthetic mirror. Also, if the proper orientation is maintained, almost all the incident energy may be directed into the diffracted beam. On the other hand, a plane wave far off the proper Bragg angle passes mostly unchanged through the hologram except for the scattering and absorption which are characteristic of the medium. A detailed discussion of these phenomena has been given by D. Gabor and G. Stroke, Proc. Roy. Soc. A., Vol. 304, p. 275-289, 1968.

In the domain of moderate optical intensities in which Maxwell's equations apply, the amplitude of the wave diffracted by any object, including holograms, is proportional to the amplitude of the incident wave. This constant of proportionality is called the diffraction efficiency or more specifically the amplitude diffraction efficiency. Since some incident beams may be diffracted more strongly than others, any object has numerous diffraction efficiencies, one for each incident beam. For a hologram, unless otherwise specified, the diffraction efficiency refers to the diffraction efficiency of a beam used to make the hologram, i.e., a properly oriented plane wave in the case of a three-dimensional diffraction grating element. The diffraction efficiency of a hologram element is dependent on the degree of alteration of the optical properties of the material. This, in turn, depends on the intensity of the beams used to make the hologram and the time of exposure. When several hologram elements are created simultaneously, as in image holography, the diffraction efficiency of a particular hologram element will be greater, the greater the intensity of the beam forming that particular element (diverging spherical wave for Fresnel zone plate elements, etc.) so that the reconstructed beams may also be correctly ordered as to intensity (thus reproducing an intelligible visual image). For a given material, type of hologram element and average total exposure, there is a maximum achievable diffraction efficiency. The diffraction efficiency of the hologram element may be adjusted from zero to any value up to this maximum by controlling the intensity or exposure time or both of the beams used to make the hologram element. The holographic literature often uses the term diffraction efficiency to refer to the ratio of the intensities of the incident and diffracted beams. This is, of course, the square of the amplitude diffraction efficiency as used in this disclosure. A discussion of some factors affecting diffraction efficiency in thin holograms has been given by A. Friesem, et al., Applied Optics, Vol. 6, No. 5, p. 851, May 1967. A study of diffraction efficiency in thick holograms has been presented by H. Kogelnik on page 605 et. seq. of Proceedings of the Symposium on Modern Optics, Polytechnic Press of the Polytechnic Institute of Brooklyn, Brooklyn, N.Y., 1967.

Thick hologram elements have been used to store information by P. J. van Heerden, U.S. Pat. No. 3,296,594. Van Heerden represented numerical quantities by three-dimensional diffraction gratings formed holographically by two-plane waves. The values of the stored quantities were retrieved as the amplitudes of a diffracted wave produced by a properly oriented incident plane wave, i.e., the information was stored as the diffraction efficiencies of hologram elements. Methods of adjusting these diffraction efficiencies to specified values are also discussed by van Heerden.

A concise general description of the disclosed invention can be given in the above terminology. Final and intermediate results are represented by the amplitudes of coherent optical beams which carry information generally according to the arrow marked flow lines of FIG. 1, such as 1, $x$, $ax$, etc. The input variables $x$, $y$, etc., are represented by the diffraction efficiencies of an input means which serves as the input store 2 of FIG. 1. Typically, the input means is a hologram and the input variables are represented by the diffraction efficiencies of its hologram elements. A coefficient means serves to store the coefficient values as does the coefficient store 6 of FIG. 1 and a program means serves to store the program information as does the program store 4 of FIG. 1. Optical beams are split, redirected and combined by diffractive M devices constructed to preferentially diffract the beams which they are to act on. Typically, these devices are thick holograms acting as synthetic mirrors. Some synthetic mirrors split optical input beams into beams which are preferentially diffracted by the input means. These are included, typically as hologram elements, in the program means since they also serve to control which beams are incident on the input and ultimately which terms appear in the resulting polynomials. The program information such as J, K of FIG. 1 is stored as the diffraction efficiencies of these hologram elements. Thus the program means or program hologram consist entirely of these hologram elements which both split beams and store information. Other synthetic mirrors serve to combine beams to form sums. These are included, typically as hologram elements, in the coefficient means since they also serve to multiply by suitable coefficients. The coefficient values are represented by the diffraction efficiencies of these hologram elements. Thus the coefficient means or coefficient hologram consists entirely of these hologram elements which both combine beams and store information. Some synthetic mirrors redirect beams diffracted by the input back toward the input for a second diffraction. These are grouped into two mirror means adjacent to the input means. In special cases, the mirror means may also split and combine beams, thus creating beams for diffraction by the input, and the coefficient means may redirect beams to the input for subsequent diffraction.

The hologram elements used in the computer may be made using the specific and exact beams which they are to diffract and produce when used in the computer. Specifically, if beam A is to access the stored value of $x$ to produce beam B with amplitude representing $x$, then the hologram element representing $x$ could be made with beam A and beam B, or exact copies of these beams. Similarly, if a synthetic mirror M is to split part of beam A into beam B, redirect beam A into beam B, or combine beams A and B, then the hologram element forming M is made with beams A and B. This insures a high efficiency of beam control. Rejection of other beams is attained by selecting the beams and hologram element type so that the hologram element has a low diffraction efficiency for those beams, present in the computer when it is operating, which the hologram element is not to diffract. In this way, an organization similar to that shown in FIG. 1 is created in which the information flow lines, marked by arrows, are realized by coherent optical beams which interact only with certain input variables and coefficients and not with others. In the disclosed computer, this selective action is achieved by the selective diffractive capability of diffractive devices and not necessarily by spatial separation of rays as in some prior art optical computers. This selectivity of diffractive capability is generally increased by using thicker holograms and by using holograms of limited spatial extent. Beams which are of more complex shape, spherical waves, cylindrical waves, ultimately beams passed through diffusers, or beams which are of limited spatial extent, ultimately rays, may be used to increase the specificity of diffractive interaction of beams and holograms.

The holograms used in the computer could be formed with blocks of photosensitive material in their mounting structures as used in the computer and by using, if necessary, the beams diffracted by other previously formed holograms to completely compensate for aberrations of lenses and other defects. If the photosensitive block requires development, it can be removed an an entity, developed and replaced so that all hologram elements in it have the correct relative positions. It would only then be necessary to assure the correct registration of the blocks realizing the input means, mirror means, etc. If the block is thicker or wider than the beam width, interference fringes will form only where the beams intersect and holograms will be formed at these intersections. It is desirable that the photosensitive material be such that its developed or exposed state is transparent, i.e., changed only in its index of refraction (e.g., a bleached hologram). Then, even if some of the material is exposed by non-intersecting beams, little absorption will occur and this unwanted exposure will cause no harm.

In the operation of the computer, the beams initially incident on the input means are considered to represent the value unity and represent the flow lines denoted 1 in FIG. 1. These beams are preferentially diffracted by the hologram elements representing the input variables $x, y$, etc., so as to form beams representing the values of these variables by their amplitude. The synthetic mirrors in the mirror means then diffractively split and redirect some of these beams so that they are again incident on the input means where they are again diffracted to form beams representing the higher powers and cross products of the input variables such as $x^2$, $xy$, $x^2y$, etc. This multiplicative action is a direct result of the fact that the amplitude of a diffracted beam is proportional to the amplitude of the incident beam and to the diffraction efficiency. The power and product beams representing $x^2$, $xy$, etc. then proceed to the coefficient means where they are diffracted by hologram elements so as to be combined into output beams. The diffraction efficiencies of these holograms elements multiply the beams with amplitudes representing variables, powers and products by coefficients such as $a$, $c$, $e$, etc., to form the terms such as $ax$, $cx^2$, $exy$, etc., and simultaneously combine such beams to form beams representing the sums which are equal to the polynomials. These coefficient multiplications may be effected by any beam selective attenuation including that resulting from diminished diffraction efficiency in the program means. However, the hologram elements in the program means are more typically set equal to either zero or their maximum value so as to delete or include terms in the polynomials calculated by the computer. By performing as much of this term selection as possible by controlling beams immediately after having entered the computer, optical energy not used to form one term can be used to form a different term.

Another important capability possessed by this computer is that of forming alternate functions when presented with alternate optical input beams. In this application, instead of deleting beams by the program means, separate optical input beams, denoted 1 in FIG. 1, are provided each of which calculates some particular term or partial sum. The program means then serves merely as a beam splitter. The function represented by a particular output beam is changed by changing the optical input beam provided. Providing several input beams simultaneously may cause still a different set of output functions to be computed.

Typically, the numerical quantities are interpreted as proportional to the diffraction efficiencies of the hologram elements which represent them. However, the diffraction efficiency could have different non-linear relationships (e.g., a logarithmic relationship) to the quantity which it represents. In this case, the products formed would be products of these non-linear functions and the output of the computer would be polynomials in these non-linear functions. However, the results could still be quite useful, e.g., for discriminant functions. Similarly, the numerical quantities represented by optical beams are typically regarded as being proportional to the optical beams which represent them, but there could be other non-linear relationships in special embodiments.

DESCRIPTION OF THE PREFERRED EMBODIMENT

In the preferred embodiment, the optical beams are plane waves that generally fill or nearly fill the system aperture and the hologram elements are planar three-dimensional diffraction gratings nearly filling the system aperture. Coherent plane waves can be produced from laser light by collimators and manipulated by telescopes, pinhole apertures, plane flat mirrors and other standard optical equipment. In order to get a strong diffraction of a beam by a hologram element, the angular orientation of the beam must make the proper Bragg angle with the planes of the hologram element. A plane wave is specified entirely by its orientation and this orientation is adjusted by plane flat mirrors on rotary tables and such standard optical equipment as telescope mounts. The planar three-dimensional diffraction gratings allow a one-dimensional continuum of orientations (i.e., of possible optical beams) having the proper Bragg angle to be highly diffracted from a hologram element and therefore suitable for accessing or reading the value of the quantity stored there. For example, in the input hologram, the element representing $x$ can be accessed by several distinct beams of different azimuth to produce several diffracted beams representing $x$, $x^2$, $xy$, etc. and several copies of each. Yet there remains a two-dimensional continuum of orientations (i.e., of possible optical beams) not at the proper Bragg angle that will not be substantially diffracted by the hologram element representing $x$, and are thus available for accessing other hologram elements and forming quantities not having $x$ as a factor such as $y$, $y^2$, etc.

Holograms representing the mirror devices also have the above diffractive selectivity and can be constructed at such orientations as to return specific beams to the input means for multiple diffraction while allowing other beams to pass through to the coefficient means. Because the hologram elements realizing the synthetic mirrors can overlap spatially, it is immediately practical to implement a much more intricate system of devices M than could be obtained by ordinary optical elements such as prisms, mirrors or semi-mirrors. The hologram elements need no individual supporting structure since they exist throughout the blocks of photosensitive material which occupy the entire system aperture. Nor is it necessary to handle any individual M device. There could be a relatively large number of holographic mirrors used just as a large number of fibers could be used to redirect rays, but hologram elements can be oriented so as to diffract specific beams and form specific polynomial terms whereas fibers could not be practically arranged to form pre-given products and powers of the input variables.

Figure 2:
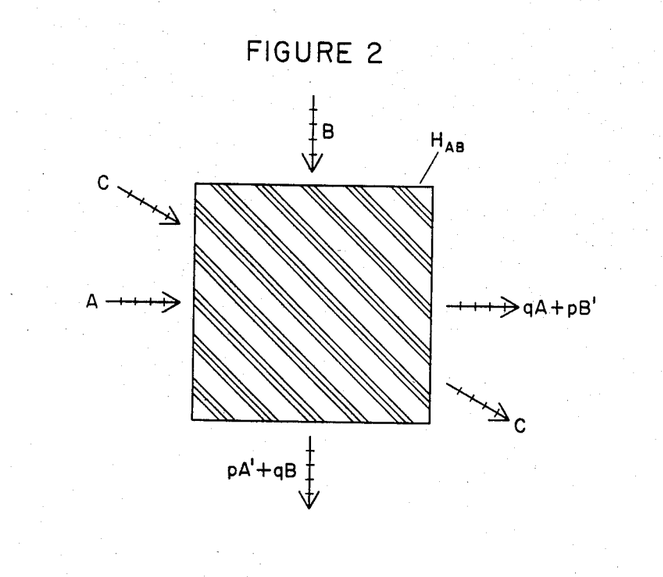
FIG. 2 shows the relationship of a hologram element to the incident, transmitted and diffracted optical beams as it multiplicatively acts on beams, splits beams and combines beams.

FIG. 2 illustrates how beams A and B are split and combined in the presence of beam C. Beams A and B (specific plane waves) are used to construct the hologram element $H_{AB}$. Time and intensity of exposure are controlled to give an amplitude diffraction efficiency $p$ in $H_{AB}$. When beam B, now with unit amplitude, is incident alone on the developed hologram, part is transmitted through the hologram and part produces a diffracted beam, i.e., beam B is split. The diffracted part has amplitude $p$ and is denoted $pB'$. The transmitted part has amplitude $q$ such that $q^2 + p^2 = 1$ and is denoted $qB$. When beam A, now with unit amplitude, is incident alone, it produces a transmitted beam $qA$ and a diffracted beam $pA'$. However, the diffracted beam $pB'$ has exactly the same orientation as the transmitted beam $qA$ and so their amplitudes combine to give a beam $qA + pB'$ as shown. If beam A, now with amplitude $x$, represents some quantity $x$ and beam B now with amplitude $y$, represents some quantity $y$, then the diffracted beam with the orientation of $qA + pB'$ represents some linear combination $ax + by$. To get a particular linear combination, $p$ is chosen so that $p/q = b/a$ solving a quadratic equation for $p$. Then the diffracted beam is given by $(q/a)(aA + bB')$ and represents the required linear combination with a scale factor $q/a$. In a typical case, the polynomials have very many terms so that only a small increment in amplitude is produced at any one step. In that case, $p$ is very small (about 1%), $q$ is approximately unity, and the diffracted beam represents $x + py$ with any additional scale factor. If beam B is absent and the hologram has a diffraction efficiency $p = y$, a variable, then the diffracted beam $pA'$ has an amplitude $xy$, a non-linear product of the variables, $x$, $y$, etc.

If beam C is not oriented at the proper Bragg angle to the planes of $H_{AB}$, is incident on $H_{AB}$, it will pass through unaltered and not affect the amplitudes of either $pA'$, $qA$, $pB'$ or $qB$.

Figure 3:
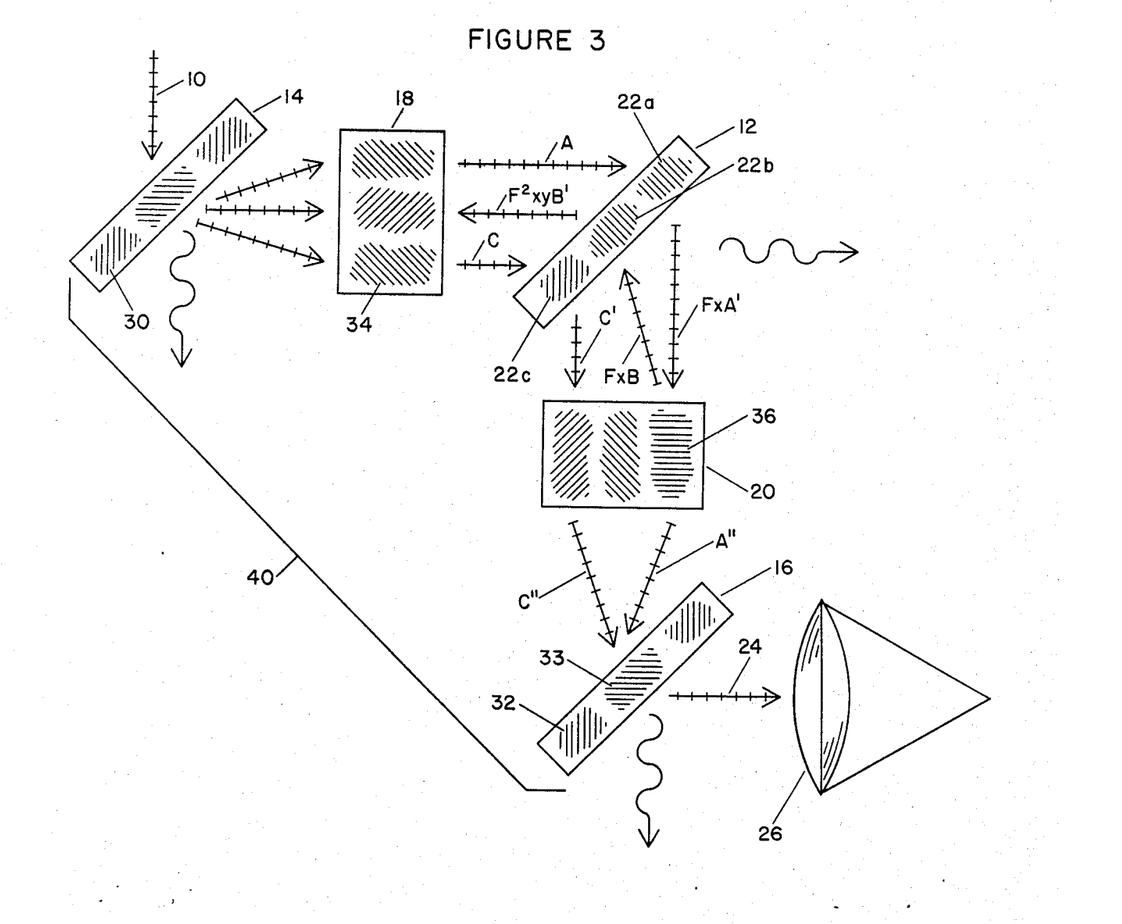
FIG. 3 is a schematic view of the preferred embodiment of the computer.

The thinnest holograms may be constructed in commercially available Eastman Kodak 649F films and plates. Thicker holograms may be constructed in doped alkali halide crystals as described by van Heerden, U.S. Pat. No. 3,296,594 and are commercially available from Carson Laboratories, Bristol, Conn. Photochromic materials such as type 43-540, produced by American Cyanimid Co., will also serve to construct thick holograms. Also, the diffraction elements may be produced by planar variations of the material density caused by ultrasonic waves. Except in the latter case, the diffraction efficiency is controlled by controlling the intensity of the incident beams and the time of exposure. If several different hologram elements are constructed simultaneously in the hologram using several different beams (as in image holograms), only the intensities of the individual beams are available to control the individual diffraction efficiencies. Although technical information relating to the exposure characteristics of holographic materials is available, it is recommended that curves relating diffraction efficiency to intensity for various exposures be produced using exactly the same process (as defined for example by developer concentration, ambient light, temperature, etc.) which is to be used to construct the holograms for use in the computer. From these curves, a given diffraction efficiency can be produced forthwith. Also, since the hologram elements of the preferred embodiment are defined entirely by their orientation and interplanar spacing, coherent plane waves of a different wave length than used in computer operation may be used to produce the hologram elements, if necessary to get adequate exposure. The orientation of the waves must then be adjusted to get the proper spacing using the Bragg relation. The configuration of the preferred embodiment is shown in FIG. 3 and is broadly denoted by the numeral 40. Computer 40 includes an input means 12, a program means 14, a coefficient means 16 and a pair of mirror means 18 and 20. Input means 12 is mounted in an operative position between mirror devices 18 and 20 so that beams of coherent radiation diffracted by input means 12 may be coupled to holographic mirror means 18 and 20 and be redirected to the input means 12. The information-bearing optical beams are shown schematically in FIG. 3 by crosshatched arrows. The folded configuration is intended to make the best use of the reflective properties of thick holograms while simplifying the disposal of wasted undiffracted light indicated in FIG. 3 by wavy lines with arrows. The surfaces of all means through which beams pass are optically flat.

Input means 12 is a hologram constructed to cause diffraction of beams of coherent radiation incident on it, by a number of hologram elements denoted by the numerals 22a, 22b and 22c. Each element represents a predetermined input variable by its diffraction efficiency.

An optical input beam 10 to computer 40 is a steady state plane wave beam of coherent radiation as from a CW laser. Beam 10 is diffractively split by program means 14 into other coherent beams directed toward the input hologram 12 and at such orientations as to be preferentially diffracted by the hologram elements of input means 12. Similarly, coefficient means 16 diffractively combines beams emanating from input means 12 and mirror means 20 to form output beams 24 representing the values to be computed. Both the coefficient means 16 and the program means 14 are holograms with typical hologram elements denoted by 32 and 30 respectively and symbolized in FIG. 3 by cross-hatched regions. The coefficient means and the program means operate symmetrically in that they may selectively attenuate the beams which they combine or split according to the diffraction efficiencies of their hologram elements. Mirror means 18 and 20 are thick holograms with hologram elements denoted by 34 and 36 respectively. The computer 40 is also provided with a lens 26 which brings the output plane waves to a focus where they may be visually inspected or be tested against a threshold value by an electro-optic sensor such as a vidicon. Although the hologram elements are shown schematically in FIG. 3 as separate crosshatched regions, it should be understood that these regions overlap and each fills nearly the entire system aperture, their selective action being attained by their distinct orientation and interplanar spacing.

In FIG. 3, there is a potential source of confusion in that there are two inputs. One input is the information input provided by the input means 12. The other is the optical input beam 10 which corresponds to the electric power input in electronic computers. The context will always make clear which type of input is referred to.

In the preferred embodiment, complex quantities are represented by the complex amplitudes of optical beams. The complex amplitude of a beam is a complex number with modulus equal to the scalar amplitude (or extent) of the electromagnetic oscillation and with argument equal to the relative phase of the oscillation. As in all analog computers, every variable must have a scale factor which in this computer may be thought of as the complex amplitude of a reference beam. The value of a variable $z$ is then the ratio of the complex amplitude of the actual beam representing $z$ to the complex amplitude of a reference beam for $z$ at some fixed point in the beam. The reference beam is hypothetical and not an actual beam but may be thought of as the actual beam which occurs when $z = 1$. The reference beam then has the same shape as the actual beam and the ratio of their amplitudes will be independent of the reference point. In the discussion of FIG. 2 above, the reference beams were assumed to have unit amplitude.

The representation of the quantity $z$ by the beam A will be denoted by the symbol $z$A. This means the complex amplitude of the beam A is proportional to the value of $z$ with the constant of proportionality being the complex amplitude of the reference beam. In the previous discussion, A has also been used to denote only the shape of the beam. The actual amplitude was sometimes arbitrary and was allowed to increase or decrease, e.g., in forming holograms to adjust diffraction efficiencies. Whether A represents an information-bearing beam of specified amplitude or a beam of arbitrary amplitude will be understood from the context.

Variables and coefficients are represented by the diffraction efficiencies of hologram elements and the value is regarded as proportional to the diffraction efficiency. It is usually convenient to work with mathematically scaled (normalized) variables with modulus less than unity. Then the actual diffraction efficiency of the hologram element representing $x$ is equal to $xF$ where $F$ is the maximum diffraction efficiency practically attainable by that hologram element for the beams used to read out $x$.

An illustration of how products of variables are formed is also found in FIG. 3. A beam A representing an input variable $x$. Beam A is preferentially diffracted by 22a and emerges from the input 12 as beam $FxA'$, representing $x$ with scale factor F. An element 36 of mirror device 20 is oriented so as to diffract this beam back towards the input means with the redirected beam being denoted $FxB$. Note that although the amplitude of $FxA'$ is not necessarily equal to the amplitude of $FxB$, both the amplitudes are proportional to $x$. The latter beam is then preferentially diffracted by element 22b representing a second input variable $y$. The resulting beam is denoted $F^2xyB'$. In the preceding, the reference beams have been taken as those beams resulting from A when the diffraction efficiencies of 22a and 22b were 100%. By taking the reference beams as those resulting from A when the diffraction efficiencies of 22a and 22b were equal to F, the scale factor $F^2$ would be eliminated from the product and absorbed into the reference beam.

Generally, scale factors are handled according to the same principles used in scaling prior art analog computers. However, because all quantities involved are complex, the details of how phase is handled are not entirely obvious. The following explanation will clarify this subject.

The symbol $H_{AB}$ will be used to denote the hologram formed by beams A and B, i.e., that which diffracts beam A into beam B and vice versa. The symbol H(C) will denote the optical beam resulting from diffracting beam C by hologram H. Thus, $H_{AB}(A)$ has the same shape and relative phases as B; however, the phase at a point in the beam will differ from the phase of B by an amount $\theta$ and the amplitude will, of course, be proportional to the diffraction efficiency, $r$, of $H_{AB}$. Thus, it can be said that $$H_{AB}(A) = R_{AB}B$$

where $R_{AB}$ is a complex diffraction efficiency with modulus $r$ and argument $\theta$ where beam A is assumed to have unit amplitude and the reference beams for A and B have unit amplitudes. Thus, $R_{AB}$ is basically a complex ratio of beam amplitudes. Note that $R_{AB}$ is not generally equal to $R_{BA}$.

The argument of $R_{AB}$ can be changed to an arbitrary value $\phi$ by making the hologram with a beam of the same shape and orientation as B but with phase shifted by $(\phi - \theta)$, i.e., by using beam A and a beam denoted $$\exp(i(\phi - \theta))B.$$

Alternately, $R_{AB}$ could be adjusted to have phase $\phi$ by using beam B and a beam denoted $$\exp(i(\theta - \phi))A,$$

i.e., the beam A with a phase shift opposite to that applied to B. (This is because a shift of phase in a beam incident on a hologram produces the same phase shift in the diffracted beam, so that when the unshifted beam A is applied to the above hologram it is forward shifted by that amount.) Thus, the complex diffraction efficiency $R_{AB}$ can be adjusted to any value with modulus less than F, the maximum diffraction efficiency of the hologram element.

To illustrate how complex products are formed, suppose the variable $$z_A = (r_A)\exp(i\theta_A)$$

is represented by beam A and the variable $$z_B = (r_B)\exp(i\theta_B)$$

is represented by the hologram element $H_{AB}$ of maximum diffraction efficiency F. Typically, $z_A$ would be a power of a variable or a product of variables such as 1, $x$, $x^2$, $xy$, etc., and $z_B$ would be a variable such as $x$, $y$, etc. The hologram $H_{AB}$ would typically be a hologram element of the input means such as $22c$ of FIG. 3, but the details of the multiplicative process can best be followed by reference to FIG. 2. It is assumed that the variables $z_A$ and $z_B$ have been mathematically normalized (by substitution, etc.) so that $r_A$ and $r_B$ are less than unity. Let the reference beam for beam A have amplitude $$(w_A)\exp(i\phi_A)$$

so that beam A has the complex amplitude $$(r_A w_A)\exp(i(\theta_A + \phi_A))$$

when representing $z_A$. Let the reference beam for the transmitted part of B have a complex amplitude of $$(w_B)\exp(i\phi_B)$$

where $w_B = Fw_A$. The complex diffraction efficiency $R_{AB}$ of $H_{AB}$ is adjusted to be $$(r)\exp(i\phi)$$

where $r = r_B F$ and $\phi = \theta_B + \phi_B - \phi_A$. It may be said that $z_B$ is stored as the diffraction efficiency of $H_{AB}$ with scale factor $$(F)\exp(i(\phi_B - \phi_A)).$$

Then the amplitude of $H_{AB}(z_A A)$ is given by $$(r)\exp(i\phi)\cdot(r_A w_A)\exp(i(\theta_A + \phi_A))$$
$$= (r\, r_A w_A)\exp(i(\phi + \theta_A + \phi_A))$$
$$= r_A r_B F w_A \exp(i(\theta_A + \theta_B + \phi_B))$$
$$= z_A z_B (w_B)\exp(i\phi_B)$$

which means the diffracted beam is $z_A z_B B$.
This establishes the product in terms of a reference beam depending only on other reference beams and not on the variables.

To illustrate how complex sums are formed, suppose that the linear combination $C_1 z_A + C_2 z_B$ is to be evaluated where $$C_1 = (r_1)\exp(i\theta_1)$$

and $$C_2 = (r_2)\exp(i\theta_2).$$

Figure 4:
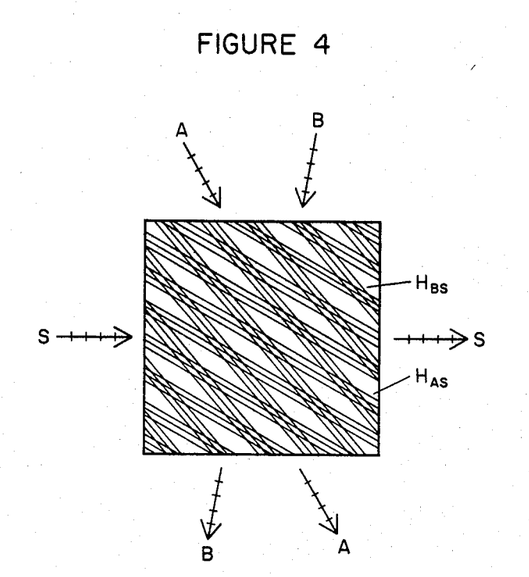
FIG. 4 shows the relationship of two hologram elements to the incident and diffracted optical beams as they combine two beams to form a sum.

Here $$z_A = (r_A)\exp(i\theta_A)$$

and is represented by beam A and $$z_B = (r_B)\exp(i\theta_B)$$

is represented by beam B. The sum $C_1 z_A + C_2 z_B$ is to be represented by a sum beam S. Typically, $z_A$ and $z_B$ would be powers of variables or products of variables such as $x$, $x^2$, $xy$, $xy^2$, etc., and $C_1$ and $C_2$ would be coefficients or products of coefficients and scale factors. Hologram elements of the coefficient means such as 32 and 33 of FIG. 3 would typically form this sum but the details of the additive process can best be followed by reference to FIG. 4.

Let the reference beam for beam A have the complex amplitude $$(w_A)\exp(i\phi_A)$$

so that beam A has complex amplitude $$(r_A w_A)\exp(i(\theta_A + \phi_A))$$

when representing $z_A$. Let the reference beam for beam B have amplitude $$(w_B)\exp(i\phi_B)$$

so that beam B has complex amplitude $$(r_B w_B)\exp(i(\theta_B + \phi_B))$$

when representing $z_B$. Define $w_{min}$ as the least of $w_A$ and $w_B$. Also define $r_{max}$ as the greatest of $r_1$ and $r_2$. Let the reference beam for the sum beam S have the complex amplitude $$(w_s)\exp(i\phi_s)$$

where
$$w_s = (F w_{min}/r_{max}).$$

The hologram $H_{AS}$ is formed with complex diffraction efficiency $$R_{AS} = (w_s r_1/w_A)\exp(i(\theta_1 - \phi_A + \phi_s)).$$

Similarly, form $H_{BS}$ with complex diffraction efficiency $$R_{BS} = (w_s r_2/w_B)\exp(i(\theta_2 - \phi_B + \phi_s)).$$

Clearly, both $R_{AS}$ and $R_{BS}$ have moduli less than F. The two hologram elements $H_{AS}$ and $H_{BS}$ could be formed simultaneously by adjusting the arguments of $R_{AS}$ and $R_{BS}$ by shifting beams A and B respectively (rather than S) and adjusting their intensities so that the proper exposures for the two holograms are obtained in the same time.

The amplitude of the diffracted beam $H_{AS}(z_A A)$ is given by the product of $R_{AS}$ and the amplitude of $z_A A$:

$$w_s r_1/w_A \exp(i(\theta_1 - \phi_A + \phi_s))\cdot(r_A w_A)\exp(i(\theta_A + \phi_A))$$
$$= (w_s r_1 r_A)\exp(i(\theta_1 + \theta_A + \phi_s))$$
$$= (r_1)\exp(i\theta_1)\cdot(r_A)\exp(i\theta_A)\,(w_s)\exp(i\phi_s)$$
$$= C_1 z_A (w_s)\exp(i\phi_s).$$

Similarly, the amplitude of the diffracted beam $H_{BS}(z_B B)$ is $$(w_s r_2/w_B)\exp(i(\theta_2 - \phi_B + \phi_s))\cdot(r_B w_B)\exp(i(\theta_B + \phi_B))$$
$$= (w_s r_2 r_B)\exp(i(\theta_2 + \theta_B + \phi_s))$$

$$= (r_2)\exp(\theta_2) \cdot (r_B)\exp(i\theta_B) \cdot (w_s)\exp(i\phi_s)$$

$$= C_2 z_B (w_s)\exp(i\phi_s).$$

It will be assumed that the maximum diffraction efficient F is low enough so that the transmitted beams are essentially unchanged in intensity even when incident at the proper Bragg angle. The amplitude of the combined beam S is then $$(C_1 z_A + C_2 z_B)(w_s)\exp(i\phi_s).$$

The sum is therefore properly established as $(C_1 z_A + C_2 Z_B)S$ in terms of a reference beam for S dependent only on the coefficients and other reference beams and not on the variables.

Specifications for beams and hologram elements used to evaluate the non-linear polynomial $ax + exy$ are given in Table I and Table II respectively. Beams are listed in Table I along with their orientations and scale factors. All beams used in this example have their wave normals in the plane of the drawing of FIG. 3 and so are specified by one orientation angle, which is measured counterclockwise from a horizontal direction pointing toward the right. The symbols denoting beams shown in FIG. 3 are in approximately the correct orientations for wave normals. As shown in Table I, each beam beam has both a mathematical scale factor and a reference beam amplitude. Although the scale factor could be absorbed in the reference beam amplitude, or vice versa, using both factors illustrates the relationship between the two scaling methods. For example, if beam B represents $x$ with a scale factor F and a reference beam amplitude G, then the actual amplitude of the beam is $xFG$. The reference could have been chosen with amplitude FG eliminating the need for a separate scale factor. Or the reference beam could have been chosen with unit amplitude in which case the scale factor would be FG. All amplitudes are relative to beam A which is assumed to have unit amplitude.

The input hologram 12 and the coefficient means 16 are assumed to allow hologram elements with a maximum diffraction efficiency F, while the mirror means 18 and 20 have hologram elements of maximum diffraction efficiency G. Typical values would be $F^2 = 1/10$ and $G^2 = 1/5$. As more hologram elements are added, these values must be reduced since the total energy diffraction efficiency cannot be greater than 100% for a particular input beam; in practice, not greater than about 40%.

TABLE I
BEAM SPECIFICATIONS

| Beam | Represents | Scale Factor | Beam Amplitude | Orientation (degrees) |
|------|-----------|--------------|----------------|-----------------------|
| A    | 1         | 1            | 1              | 0                     |
| A'   | x         | F            | 1              | 270                   |
| B    | x         | F            | G              | 100                   |
| B'   | xy        | $F^2$        | G              | 190                   |
| C    | xy        | $F^2$        | $G^2$          | 350                   |
| C'   | xy        | $F^3$        | $G^2$          | 290                   |
| A''  | x         | F            | $(P)\exp(\phi_A)$ | 270                |
| C''  | xy        | $F^3$        | $(G^2)\exp(\phi_B)$ | 290             |
| 24   | ax + exy  | $F^2$        | $FG^2/r_2$     | 0                     |

TABLE II
HOLOGRAM ELEMENT SPECIFICATIONS

| Hologram Element | Beam In | Beam Out | Complex Diffraction Efficiency |
|------------------|---------|----------|-------------------------------|
| 22a              | A       | A'       | xF                            |
| 36               | A'      | B        | G                             |
| 22b              | B       | B'       | yF                            |
| 34               | B'      | C        | G                             |
| 22c              | C       | C'       | F                             |
| 32               | A''     | 24       | $(FG^2 r_1 / r_2 P)\exp(\theta_{1-\phi A})$ |
| 33               | C''     | 24       | $F\exp(\theta_2 - \phi_B)$    |

The beam A' is partly diffracted by hologram element 36 and partly transmitted to produce beam A'' shown in FIG. 3. Beam A' is attenuated by a factor P in passing through the mirror means 20 since some of its energy is diffracted into beam B. The value of P will be near unity (since G is small) and this attenuation could be neglected, but P will be retained to complete the illustration. Also, P could include any absorption in the mirror means 20.

Mirror means 18 diffracts beam B' representing xy to beam C which, in turn, is diffracted by element 22a to beam C' which passes through mirror means 20 to produce beam C'' which still represents xy. Since the phase of an optical beam is manifest only in combination with other coherent optical beams, only the phases of the two beams A'' and C'' which approach the coefficient means 16 are shown in the table, and are denoted $\phi_A$ and $\phi_B$ respectively. The sum $ax + exy$ is to be represented by beam 24 as shown in the table.

Hologram elements are specified by the orientation of the normal to their planes, by their interplanar spacing and by their complex diffraction efficiency. The orientation and interplanar spacing are determined by the orientations of the two plane waves used to make the hologram, and hence could be replaced in the specification by the orientations of the beams used to make the hologram which are the same beams which the hologram is to relay when used in the computer. This is done in Table II in which the hologram elements are specified by the input beam and the output beam. Since the phase of the coherent optical beams incident on and diffracted by the hologram are not manifest except in combination with other beams, only the hologram elements of the input means 12 and the coefficient means 16 need be specified as to phase of their complex diffraction efficiency.

The scale factor for $ax + exy$, reference beam amplitude for beam 24, and the diffraction efficiencies for elements 32 and 33 are calculated according to the method given above, with $$z_A = xF, \quad z_B = xyF^3, \quad C_1 = aF, \quad C_2 = e/F \text{ and}$$

beam 24 playing the role of the sum beam S. Then, $$C_1 z_A + C_2 z_B = axF^2 + exyF^2 = F^2(ax + exy)$$

so the scale factor for beam 24 is $F^2$. The role of beams A and B are played by A'' and C'' respectively, so $$W_A = (P)\exp(\phi_A)$$

and $$W_B = (G^2)\exp(\phi_B).$$

Since F and G are small, it is likely that $G^2$ is less than P and $r_2$ is greater than $r_1$ so $W_{min} = G^2$ and $r_{max} = r_2$ and $W_s = (FG^2/r_2)$.

In this example, $\phi_s$ will be chosen zero since no further use is made of the phase of beam 24. The complex diffraction efficiencies of elements 32 and 33 are then calculated according to the expressions for $R_{AS}$ and $R_{BS}$ given above.

In order to adjust the phases of the beams used in making hologram elements 32 and 33, it is necessary to know the phases of the reference beams for A" and C". These phases have been apparently lost since the phases of the mirror means elements were allowed to be arbitrary. The phase information can be recovered by setting $x = y = 1$ and producing the proper hologram elements in input means 12. The phases thus set up in elements 22a effectively define the zero of the phase in these holograms. An optical input beam is then introduced for beam A and the phases of the actually resulting beams A" and C" are determined. This can be done by introducing coherent plane waves in the space below the coefficient means 16 in FIG. 3 so as to intersect that part of A" and C" that is transmitted through coefficient means 16, and form interference fringes there. The orientations of the test beams may be adjusted to be approximately parallel to A" and C" respectively so that widely spaced fringes are observed. Cutting off first one test beam and then the other, the positions of the two-beam interference fringes are noted in each case. All beams incident on the coefficient means 16 to this point are assumed to be of sufficiently low intensity so as to not expose the photosensitive material in the coefficient means 16. This is practical since holographic materials are relatively insensitive. To make the exposure, beams A" and C" are removed (for example by removing the input mean 12 from its supporting structure) and replaced by two intense beams of the same orientations. The phases of these beams are adjusted so as to produce the same fringe patterns with the test beams which are assumed to remain undisturbed. The phases of the two intense beams replacing A" and C" are then adjusted to get the proper phases in $R_{AS}$ and $R_{BS}$ respectively. This is possible since even with intense beams, holographic exposure times are generally quite long. Finally, the intensities of the incident beams A", C" and 24 (coming from the left) are adjusted to give the correct magnitudes of $R_{AS}$ and $R_{BS}$. If both A" and C" are simultaneously incident during exposure, the intensity of beam 24 must be much greater to insure that a hologram element diffracting A" into C" is not created. Small semi-mirrors can be used as aids in introducing the test beams into the space below the coefficient means. The beams can then come from the left and the mirrors rotated until wide fringes are observed on a white surface held in the beams.

If the beams A" and C" coming from the input means 12 are sufficiently intense to expose the coefficient hologram 16, then another procedure for exposing hologram elements 32 and 33 may be more expedient. The two beams A" and C" to be used in the exposure are created by adjusting the input hologram 12 so that $x = (aa^*) / a$ and $y = PF^3 (ee^*) / (exG)$ where $z^*$ denotes the complex conjugate of any quantity $z$. This automatically adjusts phase exactly and gives an amplitude proportional to the required scalar diffraction efficiency thus, at least, ordering the beams correctly with regard to intensity. A small modification in the moduli of $x$ and $y$ can then adjust the intensities needed for proper exposure in the same time so both hologram elements 32 and 33 can be exposed simultaneously. When calculating polynomials with more terms, large groups of terms can be simultaneously "programmed" in this way, e.g., in one group all the linear terms, in another all second degree terms having $x$ as a factor, etc. The program means 14 can be set up so that only one such group of terms "appears" at a time as beams emanating from the input means 12.

It should be mentioned that all beams used in these constructions must be coherent with each other, i.e., derived from the same laser source by beam splitters, etc. In the holographic exposures, it may be necessary to change the dimensions of the holograms due to temperature changes, film shrinkage, etc. If so, all dimensions affecting optical path length of any of the coherent beams must be changed proportionally including optical wave length, distance between holograms, distance to test mirrors, etc., except that dimensions affecting all beams equally such as the distance from the laser source to the first beam splitter may be left arbitrary. This means the laser source can be replaced.

All the beams used in the above example have their wave normals in one plane. Additional terms or additional polynomials would require more beams. Although many more distinct beams could be set up in this plane, ultimately, it would be necessary to find additional beams by using beams with normals skew to this plane. Such skew beams require two angles for their specification. In dealing with this larger set of beams, it will be found convenient to plot their orientations on a spherical surface such as a "blackboard globe" as used in school classrooms. A point is plotted on the globe at an orientation corresponding to the orientation of the wave normal vector. Hologram elements are plotted as point pairs corresponding to the orientations of the normals to their planes (two opposite points for each element) and two circles corresponding to those orientations at the proper Bragg angle centered on the points. Actually, the circle is a narrow band corresponding to the tolerance for diffracting off-Bragg angle beams; the thicker the hologram, the thinner the band. If a beam point lies in this band, it is strongly diffracted by the hologram element. By making such plots for each hologram means, it is easy to choose additional beams and hologram elements that will interact properly without interfering with information flow paths already set up. It should be noted that the beam orientations that are to be plotted are the orientations of the beams inside the hologram material and that the beams will be refracted on entering the hologram unless the space between the holograms is filled with a substance of matching index of refraction.

It is also necessary to utilize skew beams to get powers of variables such as $x^2$, $y^2$, etc., since within any one plane there is only one azimuth with the proper Bragg angle for beams going from one of the mirror means to the input means 12. It may appear that a potential problem arises if this second diffraction has a different maximum diffraction efficiency than the first diffraction, possibly due to slight errors in beam orientation. Even if the diffraction efficiency is different on each pass, the actual diffraction efficiency will still be the same fraction of the maximum diffraction efficiency for that pass. For example, if the maximum diffraction efficiency for the first pass of the $x$ hologram element is $F_1$ and the maximum diffraction efficiency on the second pass is $F_2$, then the actual diffraction efficiency will be $xF_1$ on the first pass and $xF_2$ on the second. The twice diffracted beam will then have an amplitude proportional to $F_1F_2x^2$. Since all terms in the polynomials are allowed to have different scale factors, no problem arises that is not solved by the method of forming sums given previously. In particular, the factor P given in Table I as an attenuation factor for beam A" could as well represent the ratio of $F_1F_2$ to $F^2$.

Other Embodiments

The above discussion has shown how complex valued polynomials of complex variables with complex coefficients could be evaluated. Since the real numbers form a subfield of the field of complex numbers, the polynomials could be restricted to have real values by suitably restricting the variables and coefficients. Since negative numbers are also part of the complex field, the real polynomial computer thus described has a full negative-number handling capability.

This type of computer can also evaluate Boolean polynomials, or logic functions, provided the variables are suitably interpreted. A Boolean polynomial has the same form as a complex polynomial except that the complement of a variable may appear in place of the variable in a given product and, since all Boolean quantities are equal to either 0 or 1, the powers of variables are not needed. A general description of Boolean functions and techniques for manipulating them is given in the book Applied Boolean Algebra by F. E. Hohn, Macmillan Co., N.Y., 1966. For Boolean computations, the input variables are represented by hologram elements with 1 denoted by the presence of a hologram element and 0 denoted by the absence of the element, i.e., zero diffraction efficiency. Final and intermediate results are represented by optical beams with 1 denoted by beam presence and 0 denoted by beam absence. Multiplication and addition are performed just as in evaluating real valued polynomials. By enumerating the various possible combinations, it is found that the proper sums and products are obtained in every case. In multiplication, a diffracted beam is produced if and only if both incident beam and hologram element are present so that the only non zero product is $1.1 = 1$. All other possible products are zero $0.1 = 1.0 = 0.0 = 0$. Similarly in addition, a combined beam is not obtained only if both beams forming the combination are absent so that the only zero sum is $0 + 0 = 0$. All other sums are equal to 1: $0 + 1 = 1 + 0 = 1 + 1 = 1$. However, the real polynomial computer, as described in the preceding paragraph, has no way of forming complements so it can only evaluate polynomials in the given variables that do not involve complements. This limitation may be removed by representing each input variable with two hologram elements, one representing the variable, the other its complement, in the above sense, i.e., 10 means 1 while 01 means 0. Then, whenever the complement appears in a term, the complement hologram is accessed. Another method of introducing complements is to modify the coefficient means so as to allow it to re-direct some of the beams representing sums back toward the input means in order to form products of sums with other input variables. Then the coefficient means can form complements of input variables represented by beams of fixed amplitude by combining that beam with a beam of equal amplitude and opposite phase.

In the Boolean version, the coefficient means is used only to combine beams since all coefficients are either 0 or 1, i.e., except for phase shifts, coefficients serve only to select terms to be summed. This task can be better performed by the program means as previously explained. When selection of an alternate optical input beam is used to select terms in the sum, the input beam can be considered as an information bearing beam representing a Boolean variable which multiplies the terms it gives rise to. In this sense, the presence or absence of a particular optical input beam can also serve to represent a Boolean input variable.

It should be understood that there is no difference in the structure of the computer when used to evaluate real, complex or Boolean polynomials. Only the details of the placement of hologram elements and the interpretation of the data and the results are different. Thus a hybrid version of the holographic computer is also quite feasible. Some variables can be real, some complex, and some Boolean. Similarly, some output functions can be real valued, some complex valued and some Boolean.

A variation on the form taken by this type of computer is the substitution of conventional transparencies such as film strips or microfiche for the input means. Such transparencies could still be read out diffractively by using the natural diffraction caused by the pattern on the transparency as in the preholographic coherent optical computers. Although not an efficient design, such a scheme could be useful for searching existing film records using the increased coefficient storage capacity of the holographic coefficient mean and the intricate beam handling capability of the mirror means to form numerous complicated non-linear discriminant functions for recognizing patterns.

The disclosed computer is essentially a static device without any inherent time sequential action. When operating, the optical beams are in a steady state condition and all outputs are formed as soon as and as long as this condition is maintained. In the preferred embodiment, this condition was caused to last indefinitely, as for a visual display, by using a CW laser as an optical power source. A time sequential action could be obtained by varying the input means either by replacing it physically with another input, as on a film strip, or by further alteration of the material, e.g., as in a photochromic hologram or an ultrasonic diffraction cell. To a lesser extent, a time sequential action could be obtained by varying the program means. When any of the holograms are changed, the optical input beams need only be maintained long enough for all beams to assume a steady state condition and for the output beams to be recorded on suitable detectors. In such a situation, a pulsed laser could be used for an optical power source provided the pulse duration is long enough for all combined beams to reach their steady state condition. The minimum duration would depend on the longest total path length of any optical beam. This requirement on pulse duration may be more severe in the disclosed computer than in other coherent optical computers because of the longer path length needed for multiple diffraction.

Comments on the Disclosure

In view of the fact that the disclosed computer is essentially static in action, the word "program" as applied to this computer may appear to be inappropriate. The word program is used here only in the sense of determining the functions evaluated by the computer. A very general method of programming has been implied in the previous paragraphs of this disclosure. In summary, this method consists of two steps. The first step is to reduce the functions to be calculated to polynomial form. In the case of real or complex valued functions, this is done by applying the standard methods of algebra and practical analysis or approximation theory. In the Boolean case, this is done by using the identities of Boolean algebra to reduce the function to the disjunctive normal form, which is a polynomial. The second step is to realize these polynomials by emplacing hologram elements one by one to form the products and sums as described previously. Since there would typically be many polynomials each with many terms, this process could be very tedious. Inasmuch as the computer would probably be applied in a special fixed domain of application (e.g., character recognition), it would generally be expedient to form as many terms as possible in the coefficient means, which would then remain fixed, and to provide such variations as necessary in the program by the program means, which would typically have a lesser number of hologram elements than the coefficient means.

By comparison of the disclosed computer to the prior art coherent optical computers previously mentioned, it is seen that for certain applications, such as linear spatial filtering, a great many hologram elements may be emplaced simultaneously, as for example by forming an image hologram of a transparency or mask. No such simple and elegant method of programming is disclosed here. The invention disclosed here is of a general mathematical nature capable of solving many problems not susceptible to treatment with prior art optical computers. Therefore, the term programming is appropriate to the (possibly sophisticated) act of controlling the disclosed computer to solve difficult and advanced problems.

Another limitation of this disclosure is that nothing has been said about the accuracy and reliability with which results are obtained. This will depend greatly on the skill with which the instrument is constructed. In particular, scattered light and spurious diffracted light may case some light to appear in the output region regardless of the results of the computation. This stray light will limit the accuracy of reading the output results due to photon noise and other noise sources. However, it should be noted that in the Boolean version and for pattern recognition, only a very coarse result is needed since the amplitude of the output beam is only for comparison to a threshold value. Since it is anticipated that most applications will be of this variety, extreme accuracy is not generally relevant.

It is also understood that the disclosed invention could be incorporated as part of a larger optical computing system which might include laser beam deflectors to deflect optical input beams, mechanical devices to substitute one input means for another, conventional optical elements for beam handling, electro-optical imaging devices applied to the output, etc. The utility of the invention may also be found in supplementing other computing devices and not necessarily in staisfying a total computing requirement.

What is claimed is:

1. A coherent optical computer comprising:
   an input means having spatial variations in its optical properties, said spatial variations being of such physical dimensions as to cause incident optical beams to be substantially diffracted by the input means and in which input data are represented by the efficiencies of the action of the input means in causing diffraction of incident optical beams,
   a mirror means for diffractively redirecting an optical beam diffracted by the input means so as to be diffracted again by the input means, and
   a coefficient means which combines optical beams diffracted by the input means so that the combined beam has an amplitude proportional to a prescribed nonlinear polynomial function of the input data.

2. A coherent optical computer as in claim 1 in which the input means comprises a hologram.

3. A coherent optical computer as in claim 1 in which the mirror means includes thick holograms acting as mirrors.

4. A coherent optical computer as in claim 1 in which the coefficient means includes thick holograms acting as beam combiners and in which the coefficients of the polynomial evaluated by the computer are represented by the diffraction efficiencies of said thick holograms.

5. A coherent optical computer as in claim 1 which includes a program means which diffractively splits an optical input beam so that the diffracted beams are incident on the input means such that the selection of the terms which are included in the polynomial to be evaluated is controllable by controlling the diffraction efficiencies of the program means.

6. A coherent optical computer as in claim 5 in which the program means includes a hologram.

7. A coherent optical computer as in claim 1 which includes a second mirror means for redirecting optical beams twice diffracted by the input means.

8. A coherent optical computer as in claim 7 in which the coefficient means includes thick holograms acting as beam combiners and in which the coefficients of the polynomial evaluated by the computer are represented by the diffraction efficiencies of said thick holograms.

9. A coherent optical computer as in claim 8 in which the input means is substantially transparent and said variations in its optical properties are variations in its index of refraction.

* * * * *